US010436905B2

(12) United States Patent
Hageney (10) Patent No.: US 10,436,905 B2
(45) Date of Patent: Oct. 8, 2019

(54) SYSTEM AND METHOD FOR POSITIONING MEASUREMENT (71) Applicant: eumetron GmbH, Aalen (DE)

(72) Inventor: Theo Hageney, Aalen (DE)

(73) Assignee: eumetron GmbH, Aalen (DE)

(*) Notice: Subject to any disclaimer, the term of this patent is extended or adjusted under 35 U.S.C. 154(b) by 0 days.

(21) Appl. No.: 16/005,795

(22) Filed: Jun. 12, 2018

(65) Prior Publication Data
US 2018/0364358 A1 Dec. 20, 2018

(30) Foreign Application Priority Data

Jun. 19, 2017 (DE) .................. 10 2017 210 166

(51) Int. Cl.
G01S 17/42 (2006.01)
G01C 3/12 (2006.01)
G01B 11/26 (2006.01)
G01B 11/27 (2006.01)
G01B 11/00 (2006.01)

(52) U.S. Cl.
CPC ............ G01S 17/42 (2013.01); G01B 11/002 (2013.01); G01B 11/26 (2013.01); G01B 11/272 (2013.01); G01C 3/12 (2013.01)

(58) Field of Classification Search
CPC ......... G01C 3/12; G01S 17/42; G01B 11/002; G01B 11/26; G01B 11/272
USPC ................................................ 356/600–640
See application file for complete search history.

(56) References Cited

U.S. PATENT DOCUMENTS 5,207,003 A 5/1993 Yamada et al.
5,227,619 A 7/1993 Vilaire et al.
6,473,189 B1 10/2002 Reedy
(Continued)

FOREIGN PATENT DOCUMENTS

DE 3143173 A1 5/1983

OTHER PUBLICATIONS

Machine translation of DE 3143173 A1 to Guter et al.
(Continued)

Primary Examiner — Tri T Ton
(74) Attorney, Agent, or Firm — The H.T. Than Law Group (57) ABSTRACT The present invention relates to a measurement system 1 comprising an angle measuring unit 2 having at least one sensor 3, a reflective element 4 opposite to the angle measuring unit 2, at least one first light source 5 arranged on the side of the angle measuring unit 2 and at least one second light source 6, 6' arranged on the side of the reflective element 4. The at least one first light source 5 is designed to emit light via the reflective element 4 to the at least one sensor 3. The at least one second light source is designed to emit light to the at least one sensor 3. The angle measuring unit 2 is designed to determine at least one angle of incidence $\beta_1$ of the light of each first light source 5 on the at least one sensor 3 and at least one angle of incidence $\alpha_1, \alpha_1'$ of the light of each second light source 6, 6' on the at least one sensor 3 and to calculate positioning information of the reflective element 4 from the determined angles of incidence $\beta_1, \alpha_1, \alpha_1'$. The present invention also relates to a corresponding measuring method.

16 Claims, 7 Drawing Sheets (56) References Cited

U.S. PATENT DOCUMENTS

| | | |
|---|---|---|
| 7,796,119 B2 | 9/2010 | Haven |
| 9,103,661 B2 | 8/2015 | Grenet et al. |
| 2012/0044504 A1* | 2/2012 | Ohnishi ................. G01B 11/24 |
| | | 356/602 |
| 2013/0120763 A1 | 5/2013 | Grenet et al. |
| 2015/0316374 A1 | 11/2015 | Winter |
| 2017/0261426 A1* | 9/2017 | Hirata ................... G01N 21/27 |

OTHER PUBLICATIONS

German Search Report issued in connection with the corresponding German Patent Application No. 10 2017 210 166.0 dated Apr. 13, 2018.

* cited by examiner

SYSTEM AND METHOD FOR POSITIONING MEASUREMENT

FIELD OF THE INVENTION

The present invention relates to a measurement system by which the positioning (place and position) of an element or body in space can be precisely measured as regards all six degrees of freedom (6DOF). The measurement system of the present invention may be employed, for example, for measuring machine tools (WZM) or for calibrating coordinate measuring instruments (KMG). The measurement system may as well be employed for exactly determining the positioning of objects or persons in space, for example for virtual reality (VR) or for surgery in medicine.

DESCRIPTION OF THE PRIOR ART

It is known that manufacturers of KMG make use of the method of computer-aided accuracy (CAA) for improving the measuring accuracy of the instruments. Accordingly, the KMG are calibrated and measured, resp., by dedicated measurement systems. It is a drawback that all known measurement systems require high expenditure for calibration. In addition, all known measurement systems can be operated by appropriately trained specialists only.

Of late, also a lot of WZM have been making use of correcting algorithms such as CAA so that said WZM equally have to be calibrated by a suitable measurement system. Correspondingly, in this case the same drawbacks as for the calibration of KMG have an effect.

Furthermore, there is no known measurement system which enables for example the key system of a KMG or the trajectory of a tool center point (TCP) of a WZM to be measured and the measuring result to be tracked online and in real time. Also, in the field of YR and in medical engineering it is frequently of advantage or even necessary to be able to track the measured positioning of a medical object in space, for example, online and in real time.

Real time tracking can be realized at present merely by means of an image processing additional to the measurement system used, for example by a structured lighting or object identification, or by a time of flight (TOF) camera or by active lighting and triangulation by plural cameras. All suited image processing systems are very limited as to their measuring accuracy, however. In addition, frequently several of said image processing systems are required at different places so as to enable real time tracking. This is usually complicated and expensive.

SUMMARY OF THE INVENTION

It is the objective of the present invention to improve the state of the art as regards the afore-mentioned drawbacks and challenges. It is especially the object of the present invention to provide an improved measurement system which is capable of providing highly precise positioning information of an element or a body in space, especially for 6DOF. The measurement system is intended to be used for calibrating or measuring a KMG and, resp., a WZM. In this respect, the measurement system is intended to be operable without great effort and by every skilled person. On the one hand, the measurement system is to work in a highly precise manner and, on the other hand, it is still intended to nevertheless enable the positioning information to be determined so quickly that online tracking of the measurement is preferably possible in real time.

The object of the present invention is achieved by the measurement system according to the independent claim 1. Further advantageous configurations of the present invention are defined in the dependent claims.

In particular, the present invention relates to a measurement system comprising an angle measuring unit having at least one sensor, a reflective element opposite to the angle measuring unit, at least one first light source arranged on the side of the angle measuring unit which is designed to emit light via the reflective element to the at least one sensor, and at least one second light source arranged on the side of the reflective element which is designed to emit light to the at least one sensor, wherein the angle measuring unit is designed to determine at least one angle of incidence of the light of each first light source on the at least one sensor and at least one angle of incidence of the light of each second light source on the at least one sensor, and wherein the angle measuring unit is designed to calculate positioning information of the reflective element from the determined angles of incidence.

Positioning information in this case is information regarding the positioning, i.e. the place and the position, of the reflective element in space. In this context, the place preferably refers to a reference point fixed on the reflective element, i.e. is the place of said reference point in space.

The position preferably refers to a surface of the reflective element facing the angle measuring unit on which the reference point is fixed, i.e. preferably is the position of said surface in space. The positioning information may comprise the absolute positioning of the reflective element in space or a change of the place and/or the position of the reflective element in space with respect to an earlier positioning or a defined and known standard positioning. The positioning information may contain, for example, a change in place (translation) as regards at least one translational degree of freedom and/or a change of position (rotation) as regards at least one rotatory degree of freedom. Preferably, the positioning information is for all 6DOF and hence contains information regarding all of the three translational degrees of freedom of the reflective element (measured at the reference point) and all of the three rotatory degrees of freedom of the reflective element (rotation about axes across the reference point).

The positioning information of the reflective element may especially be: an absolute distance z measured along the z axis from the reference point to the sensor and/or a translational deviation ztz along the z axis from a set distance or a standard distance; a translational deviation zty of the reference point along the y axis and, resp., a deviation ztx along the x axis, each measured for a defined distance z; a roll angle deviation zrz caused by rotation of the reflective element about the z axis across the reference point, measured for a defined distance z; a yaw angle deviation zgx caused by rotation of the reflective element about the x axis across the reference point, measured for a defined distance z; a pitch angle deviation zny caused by rotation of the reflective element about the y axis across the reference point, measured for a defined distance z.

An angle of incidence on the sensor in this case may be any angle characterizing the incidence of the light relative to the sensor; for example, an angle between a dimension of the sensor and the direction of light incidence; or an elevation angle between the surface of the sensor and the direction of light incidence. Two angles of incidence may be, for example, two angles between the respective direction of light incidence, on the one hand, and two different dimensions of the sensor, on the other hand, or an elevation angle with the sensor surface and an azimuth angle of the light incident on the sensor surface.

The reflective element is not necessarily completely reflecting. However, it has at least one reflective portion which is oriented and configured so that it reflects the light of the first light source to the sensor. For this, for example a surface (a partial face or the entire surface) facing the angle measuring unit can be configured to be reflecting or can be coated with a reflective layer. A reflective portion of the reflective element may even be variable as regards its position on the reflective element so that an adjustment of the measurement system can be easily performed. The reflective element and, resp., the reflective portion thereof reflects at least the light of the at least one first light source. However, the reflection characteristic may be restricted to a wavelength range including the light wavelength of the first light source. In other words, other light wavelengths may possibly pass the reflective element or at least are not reflected by the latter. In other words, the reflective element thus can be selectively reflecting, for example reflecting in a wavelength-selective manner.

The measurement system of the present invention is structured and subdivided such that different components are arranged on two opposite sides of the measurement system. On one side, especially the angle measuring unit and the at least one first light source are arranged, on the other side especially the reflective element and the at least one second light source are arranged. The reflective element and the at least one second light source may form a measuring head unit of the measurement system. Said measuring head unit may be attached to an external element or body so as to equally exactly determine, by way of the measured positioning information of the reflective element, also the positioning information of said external element or body. For example, the measuring head unit may be attached to a movable (rotatable and/or displaceable) part of a KMG to be calibrated or of a WZM to be calibrated. The angle measuring unit and the at least one first light source may form a base unit which is fixedly mounted either also on KMG or WZM or otherwise. The positioning information of the reflective element, viz. of the measuring head unit, preferably for 6DOF, can be precisely determined relative to the base unit. Thus, also the positioning information of the movable part of the KMG or WZM can be precisely determined and can be compared, for example, to a target value (e.g. a CNC-controlled WZM) or a displayed value (e.g. a measuring value of a KMG).

Since for the determination of the positioning information only the determination of the angle of incidence of the light beams is required, the place and the position of the reflective element in space can be calculated especially very quickly by the angle measuring unit. In this way, both online tracking of the measured positioning (i.e. also a positioning e.g. of a movable part of a WZM or a KMG, e.g. a trajectory of said movable part) is possible also in real time.

A central unit of the measurement system is the angle measuring unit which enables the angles of incidence to be determined, especially with very high accuracy. This provides the preconditions to be able to quickly and precisely establish the positioning information by means of the first and second light sources used. Accordingly, the at least one first light source and the at least one second light source are arranged at a defined and known distance from the sensor (e.g. a reference point on the sensor) or from the known reference point fixed on the reflective element.

Any known device that is suited for determining at least one angle of incidence of light from a light source can be used as an angle measuring unit. In a simple example, the angle of incidence can be determined from the measured light incidence position on the sensor (or a position on the sensor at which the maximum light intensity is registered).

An angle measuring unit especially suited for the present invention is described in the European patent specification EP 2 593 755 B1. The angle measuring unit described there includes, in an example, a two-dimensional sensor that contains a plurality of sensitive pixels arranged in two dimensions. By such angle measuring unit for a light source both an angle of incidence along a first dimension and an angle of incidence along a second dimension can be determined. Hence two angles of incidence can be determined. This is possible especially by the method described in EP 2 593 755 B1. In a different example, the angle measuring unit from EP 2 593 755 B1 has plural one-dimensional sensors, each sensor containing a plurality of sensitive pixels each of which is arranged in one dimension. The individual sensors of the angle measuring unit are not arranged in parallel. By such angle measuring unit, for one light source two or more (if more than two sensors are present) angles of incidence along the respective sensor orientation can be determined. Different known angle measuring units measure e.g. an elevation angle regarding a sensor surface and an azimuth angle of the direction of light incidence. Also, such angle measuring units can be used for determining the at least one angle of incidence (both elevation and azimuth angles are considered to be angles of incidence here).

Advantageously, by means of the at least one second light source of the measurement system arranged on the side of the reflective element, the absolute distance z along the z axis, the translational deviation ztz, the translational deviations zty and ztx as well as the roll angle deviation zrz can be determined very accurately by simple geometrical calculations and, resp., by triangulation. The pitch and yaw angle deviations zny and zgx cause merely very small angular changes at the sensor regarding the light of the at least one second light source so that said angular changes cannot be determined in a highly precise manner by merely the at least one second light source. However, said deviations can be determined very accurately by triangulation by means of the first light source arranged on the side of the angle measuring unit. Thus, especially the arrangement of light sources on both sides of the measurement system is of crucial advantage for the measuring accuracy thereof and the practicability thereof for calibrating a KMG or a WZM, for example.

In total, the measurement system of the present invention enables, corresponding to the possibilities of the angle measuring unit, minimum measurement uncertainties when measuring the positioning information, preferably in 6DOF.

Of advantage, the measurement system includes at least two second light sources arranged on the side of the reflective element which are configured to emit light to the at least one sensor.

The accuracy of the measurement system, i.e. of the determination of the position information, can be decisively improved by two second light sources. Preferably, the distance of each second light source from the reference point fixed on the reflective element and/or the distance of the two light sources from each other is/are known.

Advantageously, the angle measuring unit is designed to determine at least two angles of incidence of the light of each first light source on the sensor and at least two angles of incidence of the light of each second light source on the sensor.

The two angles of incidence are angles along two different dimensions of the at least one sensor, for example. For this, either a two-dimensional sensor with pixels arranged in two dimensions or two or more one-dimensional sensors with pixels arranged in one respective dimension can be used, as described above. Alternatively, as the two angles of incidence also an elevation angle regarding the sensor plane and the azimuth angle can be determined for a light source. Thus, for each light source a positioning (viz. place and position) in space can be exactly determined. Therefrom in turn the positioning information of the reflective element can be calculated with high precision. In total, the measuring accuracy of the measurement system is definitely improved by the measurement of two instead of one angle of incidence for each light source.

Advantageously, at least one light source is a point light source, and a point light source preferably is a light-emitting diode or a laser.

Point light sources have a narrower radiation angle, which helps to reduce errors in determining the angle or angles of incidence and thus to once again increase the accuracy of the system.

Preferably, the reflective element is a plane mirror having a surface facing the sensor.

The plane mirror may be arranged on an element or body of a device to be calibrated, for example on a movable tool part of a WZM. Especially, the plane mirror is very well suited for even or flat parts of a WZM or a KMG. The second light sources may be attached to the plane mirror, for example on the surface or the edges thereof, and may form, together with said plane mirror, a measuring head unit which moves corresponding to a movement of the part to be calibrated relative to the angle measuring unit.

Advantageously, the reflective element is reflecting in a wavelength-selective manner.

This wavelength sensitivity helps to suppress the underground during measurement. This means that, for example, in this way the light of other light sources or present ambient light can be faded out or filtered. Thus, an even more precise determination of the angle of incidence is possible.

Advantageously, four second light sources are arranged on the side of the reflective element, preferably at four corners of the reflective element.

Especially the reflective element in this case preferably is a plane mirror, e.g. of round, square or rectangular shape. By four light sources an even more precise determination of the position information is possible. The distances of the light sources from each other and, resp., from the fixed reference point are preferably known.

Advantageously, at least two second light sources are designed to emit light of different wavelength.

This offers the advantage that the different light sources can be simultaneously operated, but nevertheless they can be properly distinguished by the angle measuring unit by way of their light wavelengths.

Advantageously, at least one first light source is wavelength-specific.

In this way, the sensor can be selectively adapted to the specific wavelength emitted by the light source so as to perform an even more accurate angle of incidence measurement.

Advantageously, at least one first light source is arranged centrally from the angle measuring unit.

This provides further angle information which is especially sensitive to pitch and yaw angle deviations and enables more accurate determination of said deviations.

Advantageously, at least one first light source and/or the at least one second light source is a light source adapted to be clocked.

Thus, the different light sources can be operated in a clocked manner, for example one after the other. In this way, superposition faults of the light of different light sources or other disturbances in measuring the angles of incidence can be avoided, which improves the determination of the angles of incidence.

Advantageously, the sensor is wavelength-sensitive.

The wavelength sensitivity of the at least one sensor serves for underground suppression during measurement as the sensor can be adjusted exactly to the wavelengths of the light sources.

Advantageously, the measurement system further includes a control unit for time control of the angle measuring unit and/or at least one of the light sources.

In this way, either the angle measuring unit and/or the light sources can be selectively switched so as to carry out a measurement. Different sensors can be adjusted to different light sources and can be turned on by the controller appropriately in pairs only.

Advantageously, the measurement system further includes a synchronizing unit for time synchronization of the control unit with an external control unit.

An external controller may be, for instance, a computerized numerical control (CNC) of a WZM or a control of a robot arm. In this way, for example the WZM and/or the robot arm can be specifically calibrated. A displacement of the movable part to be calibrated may be carried out synchronously with the determination of the positioning information. This means that the part to be calibrated can be displaced, subsequently a measurement can be carried out, then it can be displaced again, subsequently again a measurement can be carried out, and so forth.

Advantageously, the calculation of the position and place information is synchronized with the external controller so that the position and place information can be associated without changing the displacing velocity of the part to be measured.

The present invention also relates to a measuring process comprising the steps of: emitting light from at least one first light source via a reflective element to at least one sensor of an angle measuring unit, emitting light from at least one second light source to the at least one sensor, determining at least one angle of incidence of the light of each first light source on the at least one sensor and at least one angle of incidence of the light of each second light source on the at least one sensor, and calculating positioning information of the reflective element from the determined angles of incidence.

BRIEF DESCRIPTION OF THE DRAWINGS

The present invention will be illustrated hereinafter in detail by way of the enclosed figures.

DETAILED DESCRIPTION OF THE PREFERRED EMBODIMENTS

Figure 1:
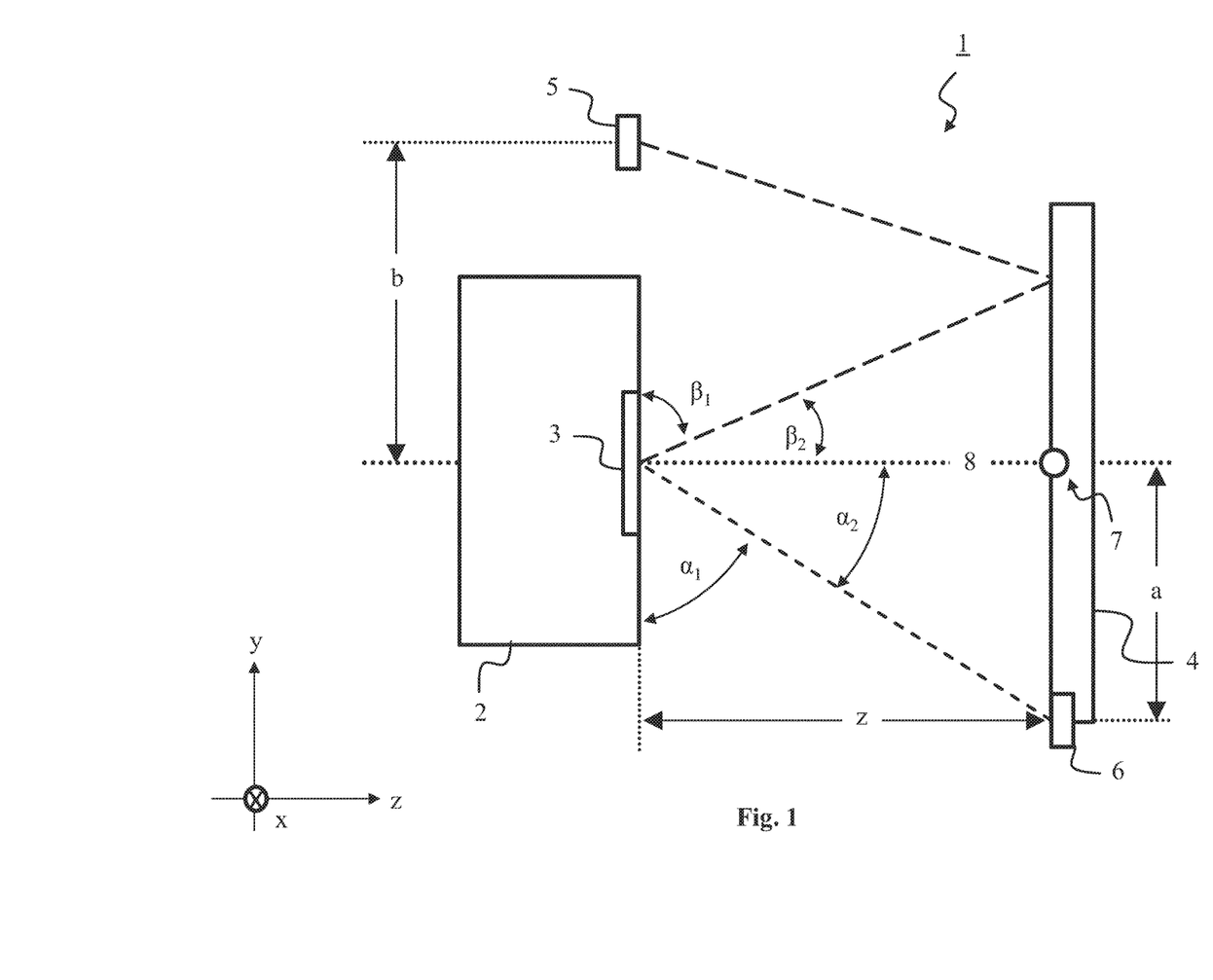
FIG. 1 shows a schematic view of a measurement system according to an embodiment of the present invention.

FIG. 1 illustrates a schematic view of an embodiment of the measurement system 1 of the present invention. The measurement system 1 is shown in FIG. 1 especially in the viewing direction along the x axis into the image plane. The z and y axes extend in the image plane, as illustrated by the coordinate system in FIG. 1.

The measurement system 1 comprises an angle measuring unit 2 shown here with one sensor 3, wherein the angle measuring unit 2 may also contain more than one sensor 3, however. Spaced apart from the angle measuring unit 2—in this case along the z axis—the measurement system 1 further comprises a reflective element 4 on which preferably a reference point 7 is fixed. On the side of the reflective element 4, for example next to or at the reflective element 4, FIG. 1 shows an attached second light source 6 adapted to emit light to the sensor 3. The measurement system 1 may include even more than one second light source 6, however. As is also shown in FIG. 1, the second light source 6 preferably emits light directly onto the sensor 3. However, it is also possible to arrange an additional optical element, for example a mirror, between the angle measuring unit 2 and the light source 6 for optimum orientation of the light of the second light source 6 to the sensor 3. The second light source 6 is arranged especially at a fixed and known distance a from the reference point 7. The distance z between the reference point 7 and the angle measuring unit 2, especially the sensor 3, is unknown—except for preferably for a standard or home position of the measurement system 1.

Being arranged on the side of the angle measuring unit 2, FIG. 1 shows one first light source 5. The measurement system 1 may as well contain plural first light sources 5 arranged on the side of the angle measuring unit 2. In particular, the at least one first light source 5 is arranged at a fixed and known distance b from the angle measuring unit 2, for example from a fixed reference point on the angle measuring unit 2, e.g. from a particular reference point on the sensor 3, such as the center thereof. FIG. 1 shows especially a position in which the center of the sensor 3 and the reference point 7 are connected on the reflective element 4 along a connecting axis 8 extending in the z direction, wherein especially also a surface of the reflective element 4 is located in parallel to the surface of the sensor 3 and the connecting axis 8 is perpendicular to said surfaces. The first light source 5 is designed to emit light to the reflective element 4 which is reflected by the latter and is thus incident on the sensor 3. Also, in this case, at least one additional optical element may be present, e.g. between the angle measuring unit 2 and the reflective element 4 so as to orientate, e.g. mirror the light of the first light source 5 onto the reflective element 4 or the sensor 3.

The angle measuring unit 2 is preferably suited for determining the angle of incidence $\alpha_1$ of the light from the second light source 6 on the at least one sensor 3, as shown in FIG. 1, and the equally shown angle of incidence $\beta_1$ of the light from the first light source 5 on the at least one sensor 3. By determination of said angles also the angles $\alpha_2$ and $\beta_2$ on the z axis shown in FIG. 1 can be determined by further simple geometrical calculations, as the surface of the sensor is oriented along the x and y axes.

By triangulation the distance z can be calculated by means of the angles $\alpha_1$ and $\alpha_2$ with further consideration of the right angle (or while assuming a right angle) between the z axis and the reflective element 4. Also, a translational deviation ztz in the z direction at a particular distance z, translational deviations ztx and, resp., zty along the x and/or y direction for a particular distance z as well as a rotatory roll angle deviation zrz of a rotation of the reflective element 4 about the z axis (across the reference point 7) for a distance z can be determined with sufficient accuracy. From the angles $\beta_1$ and $\beta_2$ by geometrical considerations furthermore rotatory pitch and yaw angle deviations of the reflective element 4 zgx and, resp., zny can be determined by rotation about the x and, resp., y axis (across the reference point 7) for a distance z.

When calibrating a KMG or a WZM, for example for a part displaceable in the z direction to which the measuring head unit 4, 6 is attached, a different measuring value for ztx, zty, zrz, zgx and zty may occur for each distance z. Also, at each target distance z a different deviation ztz may occur. In this way, KMG or WZM can be precisely calibrated.

Figure 2:
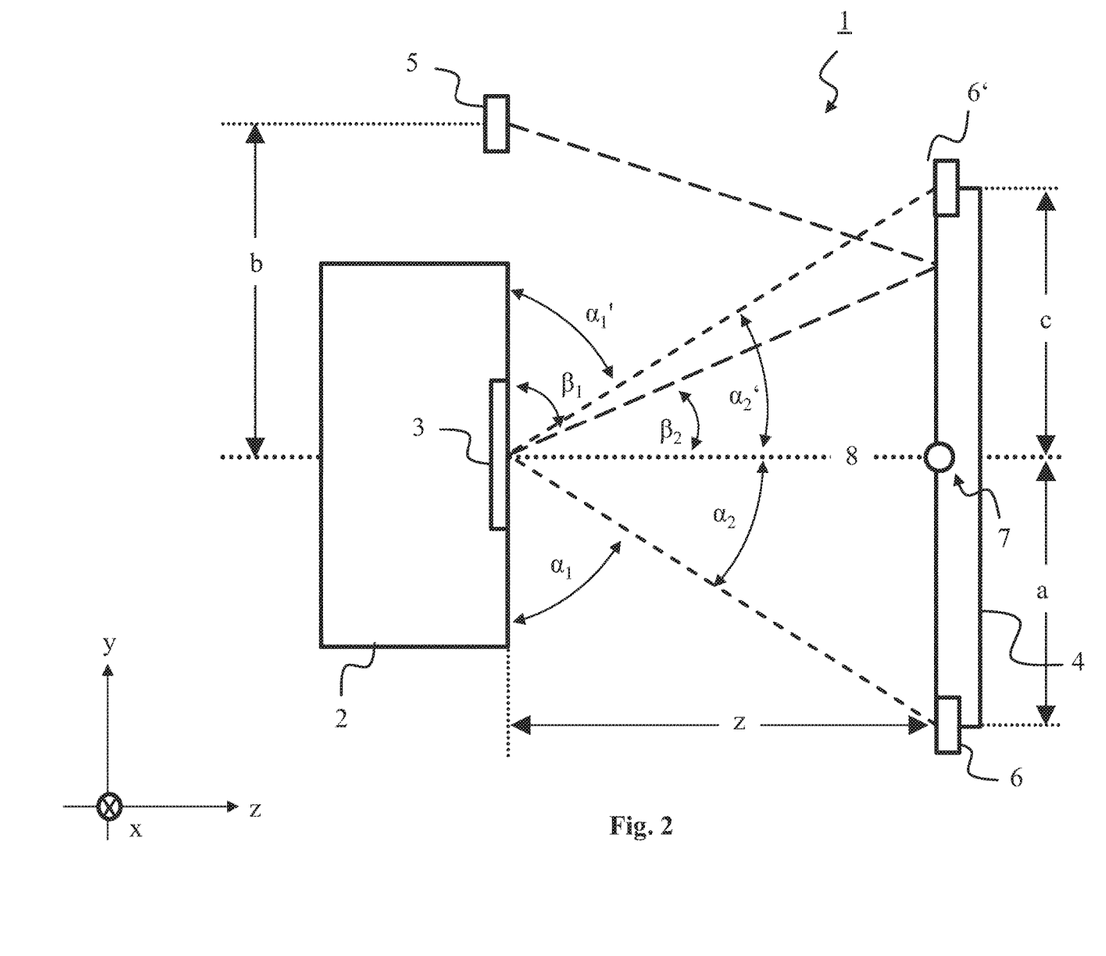
FIG. 2 shows a schematic view of a measurement system according to an embodiment of the present invention.

FIG. 2 illustrates an advantageous embodiment of the measurement system 1 of the present invention comprising another second light source 6' on the side of the reflective element 4 which is arranged, for example, next to or at the reflective element 4. This second light source 6', too, can emit light preferably directly to the sensor 3. The angle measuring unit 2 can determine the angle of incidence $\alpha_1'$ shown in FIG. 2 and consequently can also determine the shown angle $\alpha_2'$. The distance between the two second light sources 6 and 6' preferably is fixed and known and especially is the sum of the fixed and known distance a of the light source 6 from the reference point 7 and of the fixed and known distance c of the light source 6' from the reference point 7.

Figure 3:
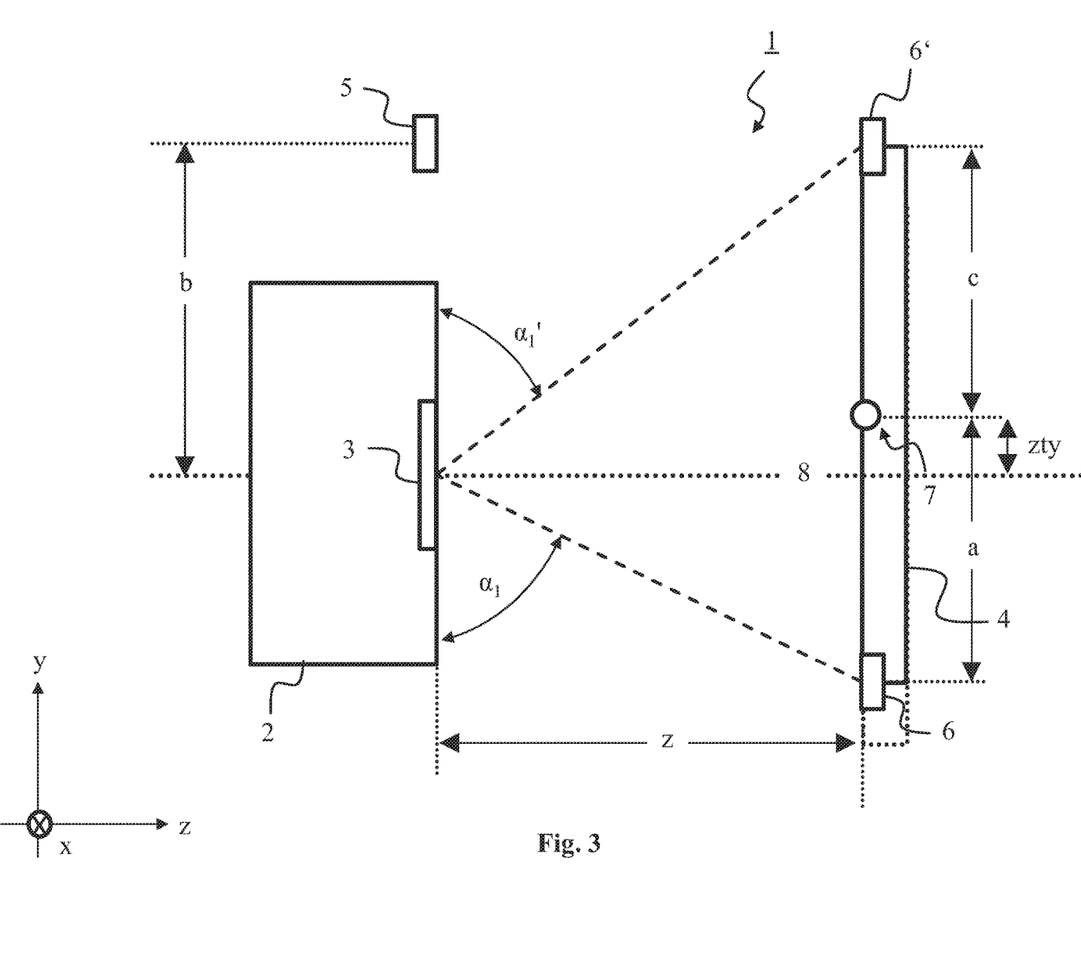
FIG. 3 shows a schematic view of the measurement system of FIG. 2.

FIG. 3 illustrates the measurement system of FIG. 2 in which the reflective element 4 is displaced from its position shown in FIG. 2 at the distance z (grey shading) along the y axis. For example, this case may occur when the reflective element 4 is applied to a part displaceable in the z direction and during displacement of said machine part to the desired distance z an undesired deviation zty in the y direction has occurred.

Figure 4:
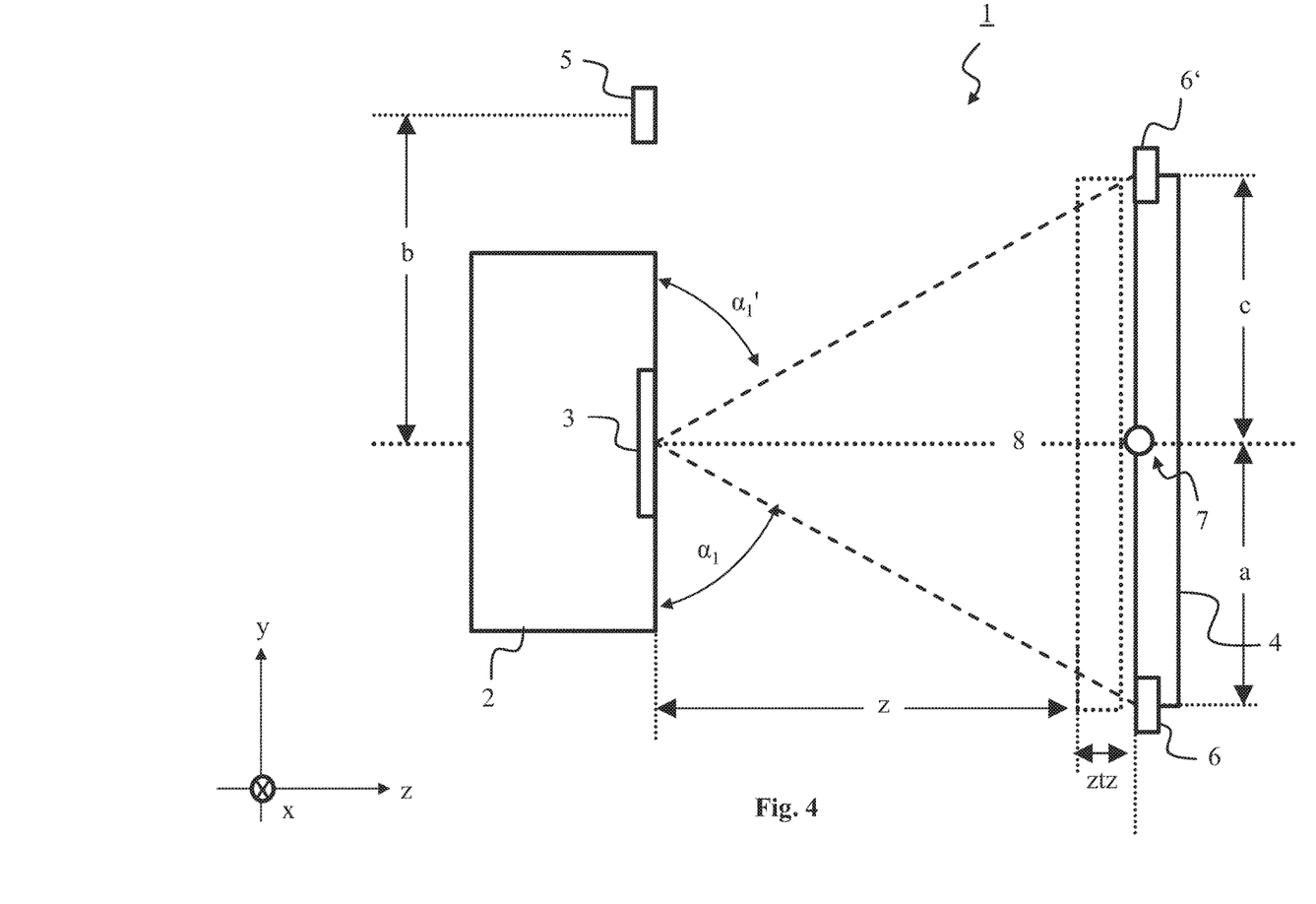
FIG. 4 shows a schematic view of the measurement system of FIG. 2.

FIG. 4 shows the measurement system of FIG. 2 in which the reflective element 4 is displaced from its position shown in FIG. 2 with the distance z (grey shading) along the z axis. For example, this case may occur when the reflective element 4 is applied to a part displaceable in the z direction and during displacement of said machine part to a desired distance z or a target distance z an undesired deviation zty in the z direction has occurred, i.e. a displacement of the machine part at a distance z in reality results in a distance z+ztz.

Equally, but not shown, at the distance z also a deviation ztx in the x direction may be provided. For measuring ztz, zty and ztx the second light sources 6 and 6' are provided. It is obvious that when said translational deviations occur the angles of incidence $\alpha_1$ and $\alpha_1'$ will vary. From the new angles of incidence $\alpha_1$ and $\alpha_1'$ the local displacement of the reference point 7 can be determined very precisely and quickly. This applies mutatis mutandis to a rotatory deviation zrz (not shown) by rotation at the distance z about the z axis (roll angle deviation) across the reference point 7.

Figure 5:
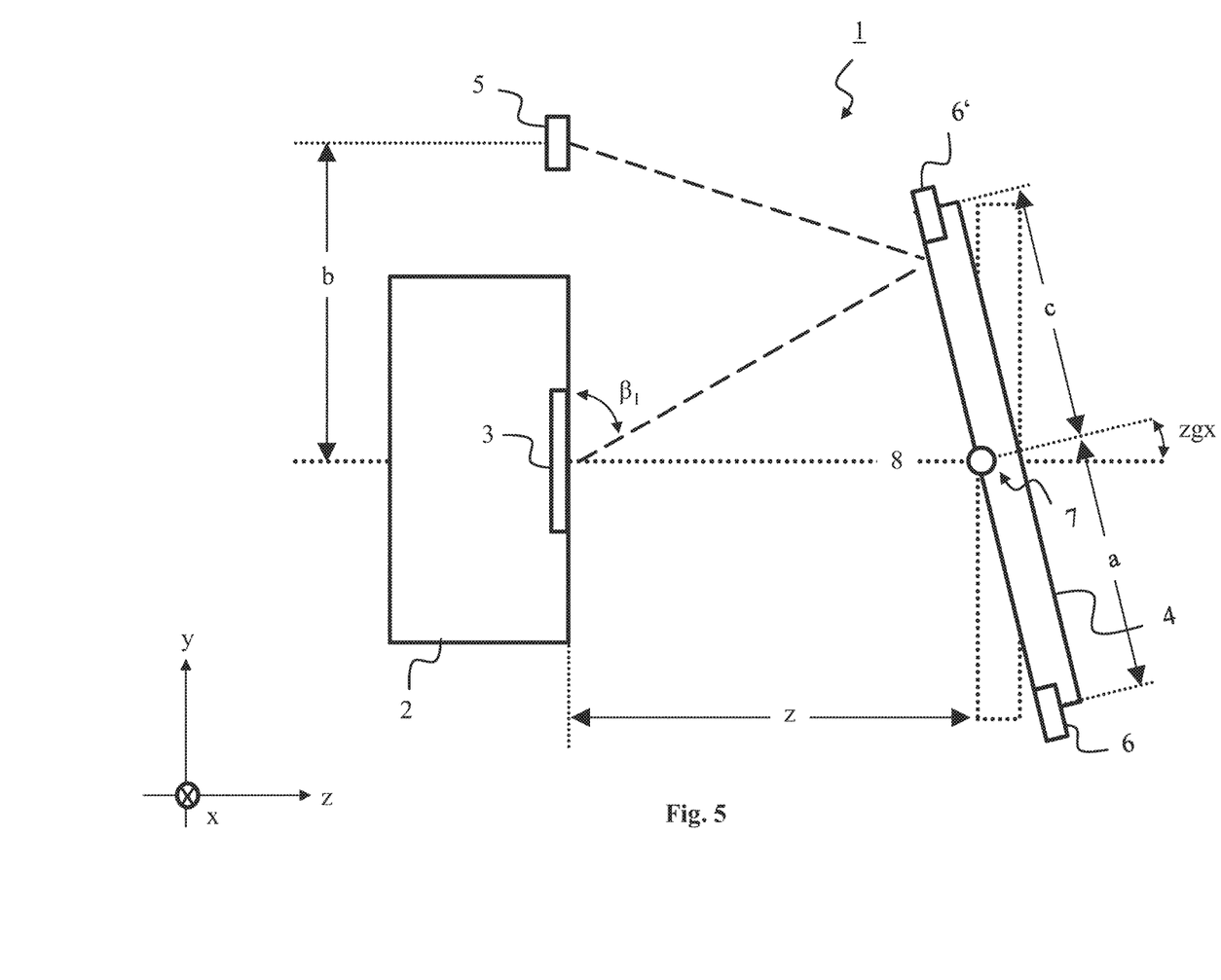
FIG. 5 shows a schematic view of the measurement system of FIG. 2.

FIG. 5 illustrates a different deviation, viz. a rotatory deviation zgx of the reflective element 4 at the distance z about the x axis extending across the reference point 7 (yaw angle deviation). It is obvious that in this case the angle $\beta_1$ varies regarding the angle of incidence $\beta_1$ in FIG. 2 without said yaw angle deviation. From the new angle $\beta_1$ and, resp., an angle variation vis-à-vis the angle in FIG. 2 the rotatory yaw angle deviation can be quickly and precisely determined. This applies mutatis mutandis to a rotatory pitch deviation zny (not shown here), i.e. to a rotation of the reflective element 4 about the y axis extending across the reference point 7.

Figure 6:
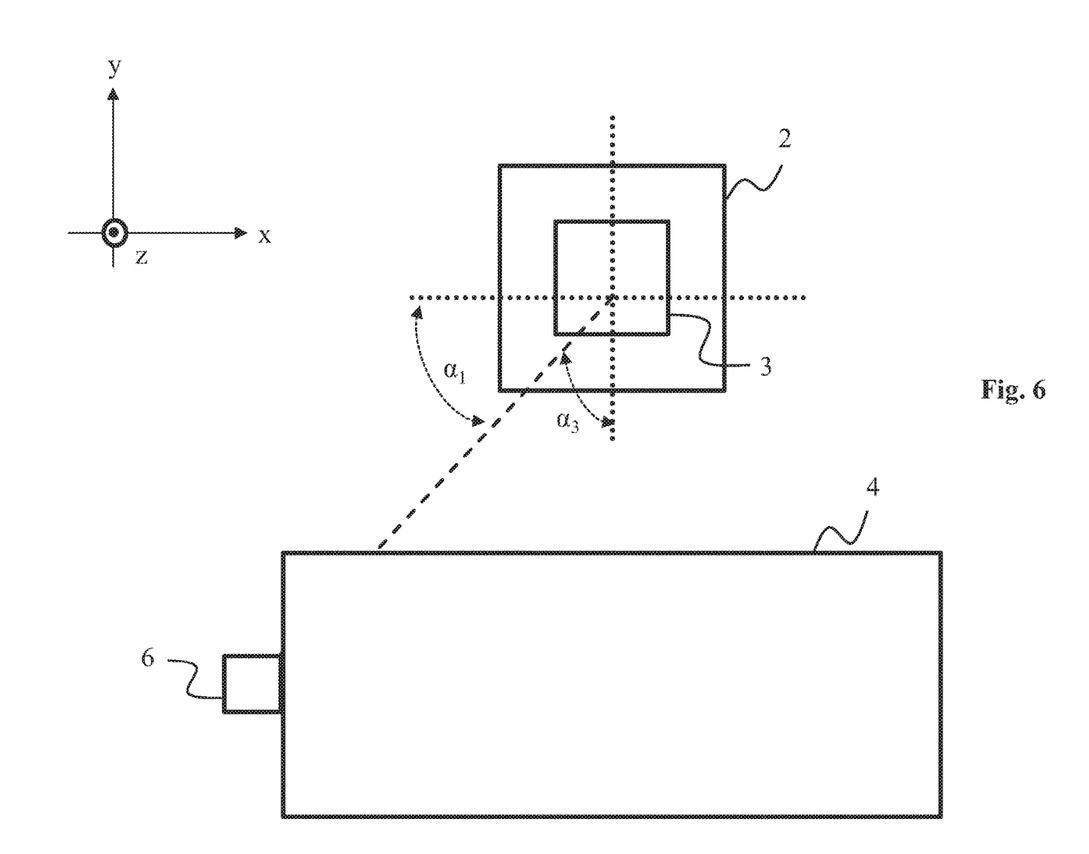
FIG. 6 shows a perspective view of a cutout of a measurement system according to the present invention.

In each of the FIGS. 1 to 5, the case of an angle of incidence determined for each light source 5, 6, 6' is shown. Preferably, the determination of at least two angles of incidence along e.g. two dimensions of the sensor 3, or both the elevation angle and the azimuth angle, is provided for even more precise determination, however. This is illustrated in FIG. 6. FIG. 6 shows a perspective view of the angle measuring unit 2 including a two-dimensional sensor 3. The sensor 3 in this case is aligned especially two-dimensionally along the x and y axes. The angle measuring unit 2 in this case is designed to determine for the light from e.g. the shown second light source 6 both the angle of incidence $\alpha_1$ relative to the x axis (viz. a dimension of the sensor 3) and an angle of incidence $\alpha_3$ relative to the y axis (viz. the second dimension of the sensor 3). Alternatively, the angle measuring unit 2 could as well determine an elevation angle above the sensor plane and an azimuth angle of the incident light so as to detect the place of the light source 6 in space. The measuring scheme shown in FIG. 6 for the light source 6 is equally possible for each further second light source 6' and for the reflected light of each first light source 5. Instead of a two-dimensional sensor, also two one-dimensional sensors (e.g. aligned once in the x direction, once in the y direction) could be present at the angle measuring unit 2. Incidentally, a known alignment of the sensor or sensors 3 deviating from the defined x and, resp., y axis (and an alignment which is not orthogonal with the z axis) can be easily corrected by the angle measuring unit 2 by appropriate calculations.

Figure 7:
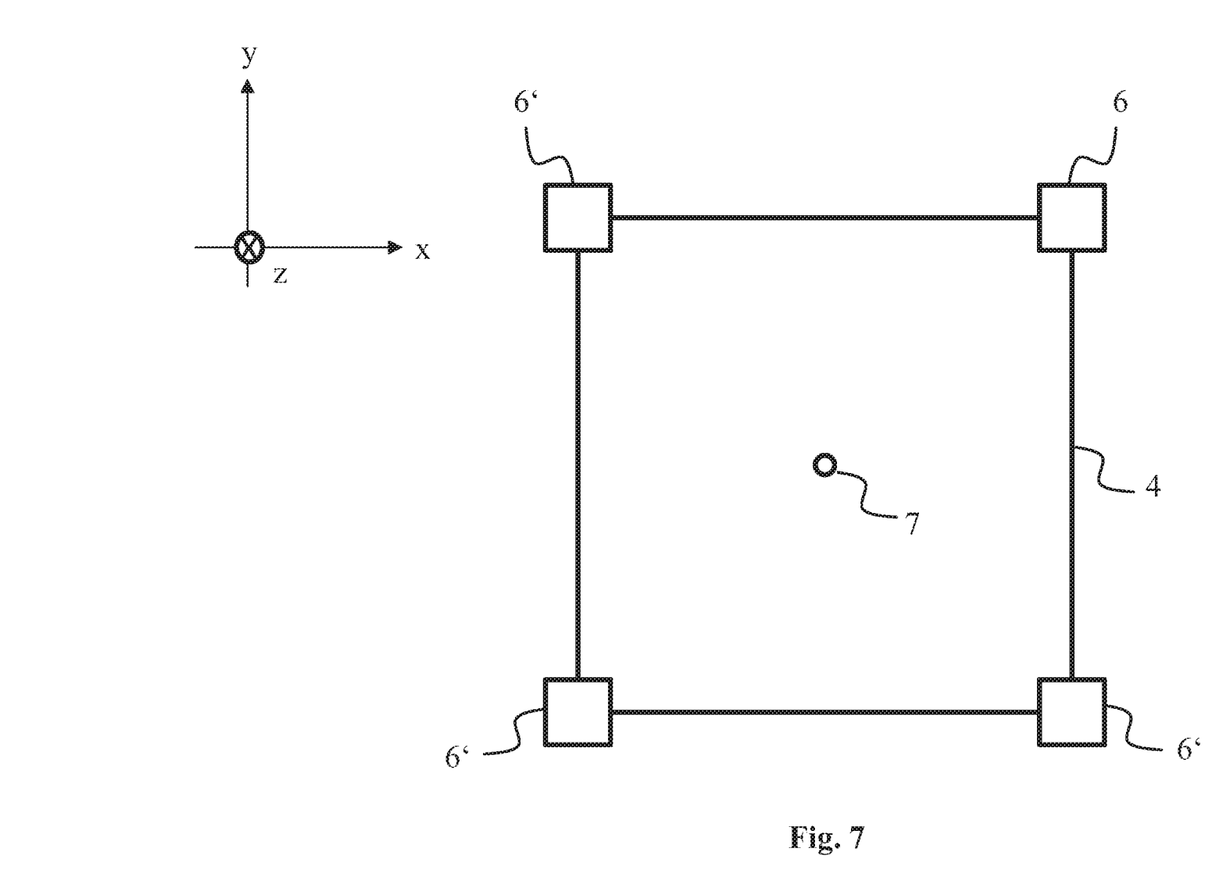
FIG. 7 shows a measuring head unit consisting of a reflective element and four second light sources according to an embodiment of the present invention.

FIG. 7 illustrates a reflective element 4, especially a top view, advantageously in quadrangular depiction here. The reference point 7 is advantageously fixed in the center of the reflective element 4. Decentralized, i.e. advantageously at the four corners of the reflective element 4, four second light sources 6 and, resp., 6' are arranged at fixed and known distances from each other and also from the reference point 7. All four light sources 6, 6' are suited for emitting light to the at least one sensor 3 of the angle measuring unit 2. Then the angle measuring unit 2 can determine one angle of incidence, advantageously two or more angles of incidence, for each light from each of the light sources 6, 6' so as to calculate together with at least one first light source 5 a highly precise determination of the position information, especially in 6DOF.

In all measurement systems 1 illustrated in FIGS. 1 to 6 the light sources 5, 6, 6' may be wavelength-specific and, of advantage, different light sources 5, 6, 6' may radiate light of different wavelengths. The light sources 5, 6, 6' may as well be light sources that are adapted to be clocked. In this way, color and/or time multiplexing of the light sources can be realized. The sensor 3 can be wavelength-sensitive or, resp., wavelength-selective in each shown measurement system 1. Equally, the reflective element 4 or any further optical element used may be wavelength-selective.

The present invention also comprises a measuring method corresponding to the presented measurement system 1, i.e. a measuring method including the following steps: a step of emitting light from at least one first light source 5 arranged on the side of an angle measuring unit 2 via a reflective element 4 arranged opposite to the angle measuring unit 2 to at least one sensor 3 of the angle measuring unit 2. A step of emitting light from at least one second light source 6, 6' arranged on the side of the reflective element 4 to the at least one sensor 3. A step of determining by the angle measuring unit 2 at least one angle of incidence $\beta_1$ of the light of each first light source 5 to the at least one sensor 3 and at least on angle of incidence $\alpha_1$, $\alpha_1'$ of the light of each second light source 6, 6' to the at least one sensor 3. And a step of calculating, by the angle measuring unit 2, positioning information of the reflective element 4 from the determined angles of incidence $\beta_1$, $\alpha_1$, $\alpha_1'$.

As a variant of the presented measurement systems 1, also the constructional design of a measurement system without second light source(s) 6, 6' is possible. Such measurement system thus comprises an angle measuring unit 2 having at least one sensor 3, a reflective element 4 opposite to the angle measuring unit 2 and at least one first light source 5 arranged on the side of the angle measuring unit 2 which is designed to emit light via the reflective element 4 to the at least one sensor 3. The angle measuring unit 2 in this measurement system is designed to determine at least one angle of incidence of the light of each first light source 5 on the at least one sensor 3. The angle measuring unit 2 is further designed to calculate positioning information of the reflective element 4 from the determined angles of incidence. Such measurement system may advantageously be used to determine pitch, yaw and roll angles of the reflective element 4, for example for an autocollimation telescope.

Another possible variant of the presented measurement systems 1 also is the constructional design of a measurement system without the reflective element 4 and without first light source(s) 5. Such measurement system thus comprises an angle measuring unit 2 having at least one sensor 3 and at least one light source 6, 6' arranged opposite to the angle measuring unit 2 which is designed to emit light to the at least one sensor 3. The angle measuring unit 2 in this measurement system is designed to determine at least one angle of incidence of the light of each light source 6, 6' on the at least one sensor 3. The angle measuring unit 2 is further designed to calculate positioning information of the light source(s) 6, 6' from the determined angles of incidence. Of advantage, such measurement system can be used for determining translations along three axes x, y, z (and for determining the roll angle zrz).

In total, the present invention presents improved measurement systems which enable a highly precise positioning measurement of the reflective element 4 and thus a highly precise measurement of an element or body in space to which the reflective element 4 is attached or applied to be carried out.

The invention claimed is:

1. A measurement system (1) comprising
   an angle measuring unit (2) having at least one sensor (3),
   a reflective element (4) opposite to the angle measuring unit (2),
   at least one first light source (5) arranged on the side of the angle measuring unit (2) that is designed to emit light via the reflective element (4) to the at least one sensor (3), and
   at least one second light source (6, 6') arranged on the side of the reflective element (4) that is designed to emit light directly to the at least one sensor (3),
   wherein the angle measuring unit (2) is designed to determine at least one angle of incidence ($\beta_1$) of the light of each first light source (5) on the at least one sensor (3) and at least one angle of incidence ($\alpha_1$, $\alpha_1'$) of the light of each second light source (6, 6') on the at least one sensor (3), and wherein the angle measuring unit (2) is designed to calculate positioning information of the reflective element (4) from the determined angles of incidence ($\beta_1$, $\alpha_1$, $\alpha_1'$).

2. The measurement system (1) according to claim 1, comprising
at least two second light sources (6, 6') arranged on the side of the reflective element (4) that are designed to emit light to the at least one sensor (3).

3. The measurement system (I) according to claim 1, wherein the angle measuring unit (2) is designed to determine at least two angles of incidence ($\beta_1$, $\beta_3$) of the light of each first light source (5) on the at least one sensor (3) and at least two angles of incidence ($\alpha_1$, $\alpha_3$; $\alpha_1'$, $\alpha_3'$) of the light of each second light sources (6, 6') on the at least one sensor (3).

4. The measurement system (1) according to claim 1, wherein at least one light source (5, 6, 6') is a point light source and
wherein a point light source preferably is a light-emitting diode or a laser.

5. The measurement system (1) according to claim 1, wherein the reflective element (4) is a plane mirror having a surface facing the at least one sensor (3).

6. The measurement system (1) according to claim 1, wherein the reflective element (4) is reflecting in a wavelength-selective manner.

7. A measurement system (1) comprising
an angle measuring unit (2) having at least one sensor (3),
a reflective element (4) opposite to the angle measuring unit (2),
at least one first light source (5) arranged on the side of the angle measuring unit (2) that is designed to emit light via the reflective element (4) to the at least one sensor (3), and
at least one second light source (6, 6') arranged on the side of the reflective element (4) that is designed to emit light to the at least one sensor (3),
wherein the angle measuring unit (2) is designed to determine at least one angle of incidence ($\beta_1$) of the light of each first light source (5) on the at least one sensor (3) and at least one angle of incidence ($\alpha_1$, $\alpha_1'$) of the light of each second light source (6, 6') on the at least one sensor (3), and wherein the angle measuring unit (2) is designed to calculate positioning information of the reflective element (4) from the determined angles of incidence ($\beta_1$, $\alpha_1$, $\alpha_1'$), and wherein four second light sources (6, 6') are arranged on the side of the reflective element (4), preferably at four corners of the reflective element (4).

8. The measurement system (1) according to claim 1, wherein at least two second light sources (6, 6') are designed to emit light of different wavelengths.

9. The measurement system (1) according to claim 1, wherein at least one first light source (5) is wavelength-specific.

10. The measurement system (1) according to claim 1, wherein at least one first light source (5) is arranged centrally of the angle measuring unit (1).

11. The measurement system (1) according to claim 1, further comprising at least one optical element for reflecting the light of at least one first light source (5).

12. The measurement system (1) according to claim 1, wherein the at least one first light source (5) or the at least one second light source (6, 6') is a light source that is adapted to be clocked.

13. The measurement system (1) according to claim 1, wherein the sensor (3) is wavelength-sensitive.

14. The measurement system (1) according to claim 1, further comprising a control unit for time control of the angle measuring unit (2) or at least one of the light sources (5, 6, 6').

15. The measurement system (1) according to claim 14, further comprising a synchronizing unit for time synchronization of the control unit with an external controller.

16. A measuring method, comprising the steps of:
emitting light from at least one first light source (5) via a reflective element (4) to at least one sensor (3) of an angle measuring unit (2),
emitting light from at least one second light source (6, 6') directly to the at least one sensor (3),
determining at least one angle of incidence ($\beta_1$) of the light of each first light source (5) on the at least one sensor (3) and at least one angle of incidence ($\alpha_1$, $\alpha_1'$) of the light of each second light source (6, 6') on the at least one sensor (3), and
calculating positioning information of the reflective element (4) from the determined angles of incidence ($\beta_1$, $\alpha_1$, $\oplus_1'$).

* * * * *